Figure 1:
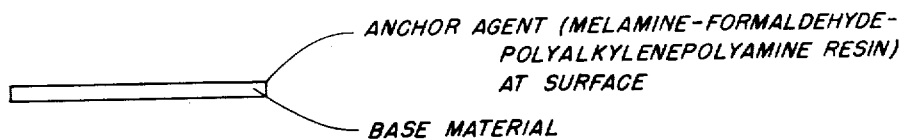

June 18, 1957   W. M. WOODING ET AL   2,796,362
SURFACE TREATMENT
Filed June 29, 1955

INVENTORS.
WILLIAM M. WOODING
YUN JEN
BY
ATTORNEY

United States Patent Office 2,796,362
Patented June 18, 1957

2,796,362

SURFACE TREATMENT

William M. Wooding, Springdale, Conn., and Yun Jen, Stamford, Conn., assignors to American Cyanamid Company, New York, N. Y., a corporation of Maine Application June 29, 1955, Serial No. 519,003

22 Claims. (Cl. 117—71)

The present invention relates to base materials having at a surface thereof a small amount of a melamine-formaldehyde-polyalkylenepolyamine resin as anchoring agent, whereby said materials exhibit improved adhesiveness or receptivity for subsequently applied top-coat material. The invention includes methods for applying the anchoring agent and top-coat material, and the products thus obtained.

This is a continuation-in-part of our co-pending application, Serial No. 343,797, filed March 20, 1953, which disclosed that non-fibrous regenerated cellulose film carrying a small amount of a cationic melamine-formaldehyde-polyalkylenepolyamine resin as anchoring agent in at least partially cured form possesses far superior adhesiveness towards subsequently applied organic top-coat material than film which has not so been treated.

Non-fibrous regenerated cellulose film is commercially manufactured by extrusion of viscose solution into an aqueous coagulating bath to form a film, clearing and washing the film, passing the film into a plasticizing bath, and drying the plasticized film. Such film is both water-permeable and water-sensitive and cannot be used as wrapping material where moisture resistance is required. Such film is therefore usually provided with an organic moisture-proofing topcoat permitting the product to be used for the packaging of moist substances including foods, or for the packaging of materials which may be subjected to moist conditions.

The organic water-proofing topcoat, if applied directly to untreated regenerated cellulose film, is rapidly sloughed off when in contact with moisture. It is known that this sloughing off can be retarded by first applying a suitable anchoring resin to the film, and then applying the topcoat.

Such anchoring resin, in the form supplied, should be freely dispersible in water so as to avoid the cost and hazard presented by organic solvents. It should form a highly moisture-resistant, odorless, and water-clear bond between the cellulose film and the subsequently applied topcoat. Moreover, the resin after application to the film should convert to an insoluble condition sufficiently rapidly to minimize delay in the manufacturing process.

Our parent application disclosed that an excellent anchoring medium is provided when non-fibrous regenerated cellulosic film is contacted with an aqueous impregnating bath containing a high molecular weight cationic melamine-formaldehyde-polyalkylenepolyamine resin and the thus impregnated film is dried. The anchoring medium thereby provided substantially meets the foregoing requirements.

We have now found that base materials of many types are benefitted in somewhat the same manner as regenerated cellulose film; that the surfaces of these materials (when carrying a small amount of melamine-formaldehyde-polyalkylenepolyamine resin) display strong anchoring even at quite alkaline pH values; that the surfaces need carry scarcely more than a trace of the resin; that the combined polyalkylenepolyamine in the resin may advantageously have a high molecular weight; and that the anchoring resin is effective even in a comparatively low state of polymerization.

The additional base materials found benefitted by the present invention are representative of the principal industrially important organic, metal, and ceramic (or inorganic type) surfaces, leading to the belief that the invention is generically applicable to surfaces in general.

The amount of anchoring resin giving excellent results on non-porous base material is so little that the resin is practically invisible, and good results are obtained with considerably less. Hence it seems that there is no amount however small which will not produce at least some benefit. On the other hand, too thick a coating tends to negative anchoring. In general, it is not economic to use more resin than that necessary to give good anchoring, and in no instance so far has it been found desirable for the anchor resin coating to be more than 0.5 mil in thickness.

The present invention is thus broadly directed at a solid base material carrying on a surface thereof a small but effective amount of a thermosetting normally water-dispersible cationic melamine-formaldehyde-polyalkylenepolyamine resin dried beyond its gel point as anchoring agent for a subsequently applied topcoat material. The resin (in its normal water-dispersible form) contains more than about 5 mols of combined formaldehyde per mol of combined melamine and the ratio of the number of nitrogen atoms in the polyalkylenepolyamine to the number of molecules of the melamine is between 0.3:1 to 10:1. The invention is further directed at the base material carrying both the anchor resin and topcoat material of all types.

Figure 2:
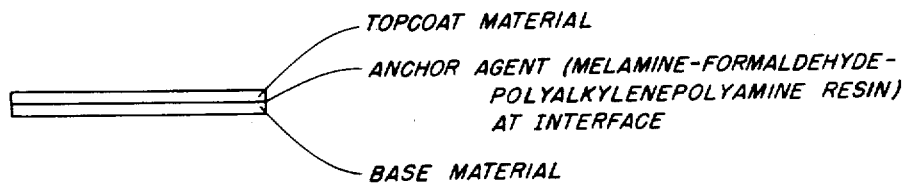

The two principal embodiments of the invention are illustrated in the drawing wherein:

Figure 1 shows schematically in section solid base material having at the surface thereof a small but effective amount of melamine-formaldehyde-polyalkylenepolyamine resin as anchor agent, and Figure 2 shows schematically in section solid base material having anchor agent at the surface thereof and topcoat material over the anchor agent so that anchor agent is at the interface between the base material and the topcoat material.

The anchor resin-containing base material of the present invention has the important advantage of displaying excellent bonding for topcoat material while at a neutral or even distinctly alkaline pH. This has two principal effects. In the first place, acid-sensitive substances may be employed as topcoat material. In the second place, numerous base materials are harmed by acid, regenerated cellulose film being an excellent example of this. The anchoring resin, in the quantities applied, is odorless and non-toxic and practically invisible.

The invention includes methods for applying the anchoring resin. Broadly this is done by contacting the base material with the resin in dilute aqueous dispertion, and drying the base material. A small but effective amount of the resin is retained, which is sufficient for anchoring purposes, and drying the base material is sufficient to convert the resin thereon to hydrophobic form. Better results are generally obtained when polymerization of the resin is carried to substantial completion as by drying or heating. The topcoat material is applied as a terminal step, and the step of drying the topcoat material and polymerizing the anchoring resin may be combined. A particularly advantageous feature of the anchoring resin is its lack of sensitivity for polyvalent anions such as the anions normally present in well and river water as well as those delivered by freshly-formed regenerated cellulose film. The resin is thus quite resistant to harm by contamination. Moreover, the resin is compatible with the non-ionic water-soluble polyhydric alcohols, such as glycerol. Hence the resin may be mixed with a suitable alcohol and the steps of plasticizing regenerated cellulose film and impregnating the film with anchoring resin may be combined, thus eliminating a separate step which would otherwise be necessary. The invention includes the step of incorporating the anchoring resin into the aqueous phase of cationic latex paints, wax emulsions and other coating compositions thereby imparting to said compositions self-anchoring properties.

A most important advantage is that the process of the present invention does not require a prolonged heating step, when applied to commercial production. We have found that the anchor resin after dilution with water and application to base material, polymerizes substantially completely within a few days or a week. The topcoat material may thus be applied as soon as the surface has been dried (which may take place at room temperature).

One method for treating regenerated cellulose film according to the invention is illustrated in detail as follows.

A dual purpose bath is prepared by forming an aqueous solution containing between about 0.005% and 3% by weight of a melamine-formaldehyde-polyalkylenepolyamine resin of the present invention and about 8% glycerol as plasticizer. The resin as prepared generally has a pH of about 6.5–8.5, and thus the bath is substantially neutral. The pH may be adjusted if desired within the range of 4–10 by addition of acid or alkali. Regenerated cellulose film in wet swollen condition is then passed through the bath, whereupon the film is impregnated both with the plasticizing agent and with the resin. Resin pickup is largely dependent on the percentage of resin in the bath and the dwell time of the film therein. For satisfactory commercial results the dwell time of the film in the solution need be only long enough to give the film (dry basis) a resin content of 0.1% to 1%, and a residence time of 3–5 seconds to 1 minute is sufficient. Increasing the resin content to 3% improves the anchoring effect, but usually the improvement is less than proportional to the added weight of the resin.

The film is then passed over drying drums heated to the normal temperature of about 150° F.–250° F. for about 10 seconds to five minutes to dry the film, whereby the resin is thermocured beyond its gel point. The film may then be wound into rolls and shipped. It is a feature of the invention that the anchoring resin acts as antiblocking agent permitting the film to be unrolled more readily than would otherwise be the case.

If desired, a topcoat may then be applied and customary methods for the application of topcoat material in the absence of anchoring resin are suitable. In the case of topcoats applied as solutions, suspensions or emulsions the base material may be heated to accelerate drying. Where the topcoat is a thermoplastic adhesive and a further coating such as wood veneer, metal foil or transparent film is applied thereon, the base material may be heated to keep the adhesive in tacky form until the outer coating is deposited.

Anchoring resin may be applied to metal foils and hydrophobic organic films in the same manner as regenerated cellulose film is treated, the plasticizer, of course, being omitted as unnecessary. In the case of large articles which cannot be moved conveniently the resin may be applied by sponging the article with a dilute aqueous solution of the resin, or applying the resin as a spray or by means of a roller.

It is a particular feature of the invention that the resins employed for anchoring exhibit considerable substantivity to most base materials so that when washed with water only excess resin is removed and enough remains to provide very satisfactory anchoring. As a result, structures may be treated while they are damped or in the rain.

The optimum amount of anchoring resin which should be present on any base material depends in each instance on such independent variables as the composition of the anchoring resin and its degree of polymerization, the particular base material employed, the porosity or lack of porosity of the material, and the nature of the topcoat material to be applied. The optimum amount of anchoring resin in each instance is therefore most easily found by routine laboratory trial.

Cure of the resin for purposes of the present invention appears to proceed in two stages. The first stage is insolubilization of the resin, and occurs when the impregnated film is allowed to dry at room temperature. In this stage the film is in suitable condition for reception of topcoat material, but even after topcoat material is applied the film possesses little water resistance. In the second stage, the resin is substantially completely polymerized. The film enters this stage when the impregnated film is heated at 150°–250° F. momentarily or when the film is stored at room temperature for a short time. In this stage, the resin affords very satisfactory anchoring and water resistance.

The topcoat may be applied when the resin is in either of the two stages of cure. Maximum anchoring effect, however, takes place when the resin is in its full state of cure. When the topcoating is applied over anchoring resin in the first stage of cure, the topcoated sheet should be aged or heated before use to cause the resin to pass into the second stage.

The minimum time required for the resin to enter its first stage of insolubilization at room temperature is most easily found by trial. At least a few minutes have always been required and so far more than three days has not been required.

Resins suitable for use in the present invention are disclosed and claimed in copending applications Serial Nos. 343,791 and 343,792, filed on March 20, 1953, and applications Serial Nos. 520,358 and 520,359, filed on July 6, 1955, by T. J. Suen and Yun Jen. These applications are therefore made a part hereof.

The anchoring resins are characterized by a content of at least five and preferably more than six mols of formaldehyde per mol of melamine therein. The syrups are distinctly more stable when containing eight mols of formaldehyde per mol of combined melamine. There appears to be no maximum limit to the amount of formaldehyde which the syrup may advantageously contain but only negligible improvement in stability occurs more than thirty mols are used. Preferably then, the syrup contains between about 8 and 30 mols of formaldehyde per mol of melamine.

According to one method for preparing the resins, the melamine and the formaldehyde are mixed and heated at about 75° C. under alkaline conditions, for about half an hour or until at least about five mols of the formalin have reacted, whichever is longer. The polyalkylenepolyamine is then added and the reaction continued at about pH 2–7. The resin shows acceptable activity as a bonding agent very shortly thereafter. Very good results have been obtained when polymerization was continued to the point where the product, on dilution with water, exhibited a bluish colloidal haze in similar manner to the product of U. S. Patent No. 2,345,543. If desired, the polymerization may be carried until the resin is on the verge of gelation. In practice we have found it advantageous to terminate the reaction when the viscosity of the syrup at 35% solids and 25° C. is at least 50 centipoises and preferably between about 200 and 500 centipoises so as to obtain a stable water-soluble or water dilutable product of large molecular size while avoiding the danger of gelation.

Alternatively, the melamine and all the formaldehyde and polyalkylenepolyamine may be mixed together and the mixture heated to about 70° C. for a few minutes, after which the mixture is heated at an acid pH until the desired viscosity is obtained. Alternatively still the melamine and formaldehyde may be reacted at an alkaline pH until a low polymer has formed, after which the polyalkylenepolyamine is added and the reaction continued at an acid pH. In each instance no more than about five mols of formaldehyde need be present during the initial alkaline reaction and the remainder of the formaldehyde may be added when the mixture is brought to the acid side.

Still alternatively, any of the methylol melamines may be employed to replace corresponding amounts of melamine and formaldehyde. Thus, trimethylol melamine may be heated with three mols of formaldehyde at an alkaline pH and then reacted with the polyalkylenepolyamine at an acid pH. Furthermore the methylol melamine employed may be in the form of a low polymer. The present invention includes the use of a mixture of resins, and thus it is within the scope of the invention to add other cationic resins which have heretofore been found useful as anchoring agents.

The manner in which the resins are formed is not a particular feature of the invention and, as has been shown, a variety of methods may be employed each of which yields a substantially similar product as judged from anchoring results obtained.

The amount of polyalkylenepolyamine should be sufficient to supply between about 0.3 and 10 nitrogen atoms per molecule of melamine. Less than this results in the development of a resin of inferior characteristics, either because of insufficient stability, poor water-dispersibility or inferior anchoring results. The use of a larger amount of polyalkylenepolyamine does not increase the effectiveness of the resin as anchoring agent and results in development of a resin which cures at a considerably slower rate. As a practical matter, it is preferred to employ polyalkylenepolyamine in amount sufficient to supply between about 0.5 and 4 nitrogen atoms per molecule of melamine as in this range satisfactory stable resin is usually obtained which gives very good anchoring and which cures rapidly.

Any of the simple water-soluble polyalkylenepolyamines and/or their salts may be used. These include such polyamines as diethylenetriamine, triethylene tetramine, tetraethylenepentamine, and the corresponding polypropylenepolyamines, as well as 4,4'-iminobisbutylamine, and 3,3',3''-nitrilotrispropylamine. We have found 3,3'-iminobispropylamine to be very effective. In general, any water-soluble aldehyde-reactive polyalkylenepolyamine may be used so long as the ratio of carbon atoms to nitrogen atoms therein is not greater than about 4:1.

The higher polyalkylenepolyamines may likewise be used so long as they are water-soluble. Among these are specifically included polyethylenimine (formed by homopolymerization of ethylenimine) and the long chain polyalkylenepolyamines formed by reacting a simple alkylenediamine or a simple polyalkylenepolyamine with about 0.6–1.5 mols of an alkylene dichloride, an alkylene dichlorohydrin, or epichlorohydrin. Thus ethylenediamine or trimethylenediamine may be reacted with 1,2-dichloroethane, 1,3-dichloropropane, 1,2-dichloropropane, etc.; cf. U. S. Patent No. 2,616,874. The polyalkylenepolyamines thus formed may have a molecular size so high that 33% aqueous solutions thereof have a Gardner-Holdt viscosity at 25° C. of N.

In addition there may be used the intermediate sized polyalkylenepolyamines formed by reaction of simple polyalkylenepolyamines with small amounts of suitable dihalides.

The resins are stabilized by cooling and adjusting their pH to alkalinity followed by the addition of formaldehyde if desired. In this form they remain stable for many months.

The resins are infinitely soluble or dispersible in water and may be used without further treatment.

The practice of the process of this invention can be extended so as to include the treatment of a variety of non-fibrous cellulosic films. It may be applied to films of regenerated cellulose prepared from solutions of cellulose xanthates, cuproammonium cellulose, cellulose nitrate, cellulose acetate, cellulose acetobutyrate, and the like.

Amongst those water-repellent topcoats which may be used in the final treatment of the cellulosic films after they have been subjected to treatment in the resin bonding bath, are those coating compositions, aqueous or organic solutions or aqueous emulsions containing as the film-forming constituent, compounds such as nitrocellulose, cellulose acetate, methyl cellulose, deacetylated chitin, polyethylene, rubber, chlorinated rubber, rubber hydrochloride, ethyl cellulose, butyl methacrylate, moisture-resistant lacquers, waxes such as montan wax, beeswax, carnauba wax, and other conventional film-forming waterproofing materials. The top coat is not necessarily a continuous film. It may thus consist of printed legends, revenue stamps, or decorative matter.

The invention has been set forth above. It will be illustrated by the following examples. These examples represent only specific embodiments of the invention and are not to be construed in limitation thereof. Parts are by weight unless otherwise stated.

The following illustrates the preparation of resins suitable for the practice of the present invention.

RESIN A 252 parts of melamine (2 mols), 1620 parts of 37% formalin (20 mols) and two parts of 20% sodium hydroxide solution were charged into a reaction vessel fitted with a stirrer. The mixture was heated at 75° C. for 30 minutes and then cooled to 65° C. 120 parts of 3,3'-iminobispropylamine (0.92 mol) and 90 parts of 37.5% hydrochloric acid were added. An exothermic reaction took place and the mixture was held at 70° C. by cooling for about 20 minutes. When the viscosity reached I, by the Gardner-Holdt method, 50 parts of sodium hydroxide were added, followed by 1296 parts of 37% formalin. The batch was water-clear and had a solids content of 27% when cooled to room temperature. A sample formed a stable colloidal cationic dispersion on dilution to 1% with water. A sample remained stable for more than 4 months.

The resin contained 0.92 mols of the 3,3'-iminobispropylamine for every two mols of melamine. Since the amine contained three nitrogen atoms, the ratio of the number of amine nitrogen atoms in the amine to the number of mols of the melamine was $(0.92 \times 3):2$ or 1.38:1.

RESIN B

The preparation of Resin A was repeated except that the reaction was run under nitrogen and 140 parts of triethylenetetramaine were used in place of the iminobispropylamine. A product of similar characteristics was obtained which was light straw in color and had a lower viscosity.

RESIN C 63 parts of melamine (0.5 mol) and 324 parts of formalin (9.7 mols) were mixed in a suitable reactor and the pH of the mixture adjusted to 7.6 with triethanolamine. The mixture was heated to 80° C. under nitrogen and held at this temperature for 20 minutes. 47.5 parts (0.25 mol) of freshly distilled tetraethylenepentamine in 10 parts of water were added to the reaction mixture and the mixture was then acidified with 50 parts of 50% formic acid to a pH of about 2.0. The mixture was cooled to 30° C. in five minutes and neutralized with dilute sodium hydroxide solution. The viscosity of the resin was about F-G on the Gardner-Holdt scale. The resin was stable and light straw in color. The ratio of the number of polyalkylenepolyamine nitrogen atoms to the mols of melamine was 0.25×5:0.5 or 2.5:1.

RESIN D

The following illustrates the preparation of a resin containing an extremely high molecular weight polyalkylenepolyamine in combined form as substitute for the simple polyalkylenepolyamine resins A, B and C.

A mixture of 531 gm. (4 mols) of 3,3'-iminobispropylamine, 202 cc. of water, and 317 gm. of ethylenedichloride were refluxed for three hours, at which time the reaction mass was a viscous syrup. The syrup was diluted with 812 cc. of water and the resulting syrup had a viscosity of 140 centipoises. The syrup contained 33% solids by weight. It was essentially an aqueous solution of a high molecular weight polyalkylenepolyamine hydrochloride. The calculated number of nitrogen atoms per gram of the solution was 0.0062.

A mixture of 126 gm. of melamine (1 mol), 810 cc. of 37% aqueous formaldehyde (10 mols) and 4 cc. of a 50% aqueous triethanolamine solution were reacted at 70° C. for five minutes.

To this was added 90 gm. of the 33% aqueous solution of the high molecular polyalkylenepolyamine solution described above and the mixture reacted at 75° C. for six minutes. The pH during reaction was 4.6. A viscous solution resulted which was diluted with 648 cc. of 37% aqueous formaldehyde, after which 14 cc. of 20% aqueous sodium hydroxide was added. The pH of the resulting solution was 7.3 and its viscosity was 30 centipoises at 25° C. It was miscible with water in all proportions. By calculation the number of polyalkylenepolyamine nitrogen atoms in this resin was 0.0062×90 per molecule of melamine or 0.59 polyalkylenepolyamine N atoms per molecule of melamine.

*Examples 1-3*

Resins A, B and C were tested as follows. Wet swollen non-fibrous regenerated cellulose films were soaked in water until all solubles had dissolved.

A master plasticizing bath solution was prepared by forming an 8.0% solution of glycerol in deionized water.

Plasticizing-anchoring baths were prepared by adding resins A, B and C to aliquots of the glycerol solution in the amounts shown in the table below.

Samples of the wet, swollen, non-fibrous, regenerated cellulose films were treated in the plasticizing-anchoring solutions for five minutes, drained for 10 minutes, and dried for 10 minutes at 200° F. in a clamping frame. The dried films were flexible and water-clear.

Control samples were prepared in the same manner by the use of plasticizing solution to which no resin had been added.

Before use, the baths were adjusted to the pH values shown in the table. Absence of a pH value indicates that no pH adjustment was made.

When dry, all films were immersed in a standard nitrocellulose topcoat lacquer solution prepared as described in U. S. Patent No. 2,394,009, drained, air-dried for 1 hour, and further dried at 210° F. for 3 minutes. These films were also water-clear in appearance, and odorless.

Strips were cut from all the films, all the edges of the strips being freshly cut, and the strips were subjected to the standard accelerated slough test in sets of three, wherein they are immersed in water at 180-190° F., and tested every minute by rubbing with moderate pressure between two fingers, and the results averaged.

| Run | Anchoring Resin | | Bath pH | Minutes to Slough [c] |
|---|---|---|---|---|
| | Ex. | In Bath [a] | | |
| | | Percent | | |
| | | In Film [b] | | |
| | | Percent | | |
| Control | | | | 2 |
| 1 | A | 0.05 | 0.43 | | 24 |
| 2 | A | 0.10 | 0.62 | | 33 |
| 3 | A | 0.50 | 1.20 | | 93 |
| 4 | A | 1.00 | 2.16 | | 164 |
| 5 | A | 0.50 | 0.88 | 4.0 | 65 |
| 6 | A | 0.50 | 1.24 | 5.0 | 74 |
| 7 | A | 0.50 | 1.29 | 6.0 | 94 |
| 8 | A | 0.50 | 1.38 | 7.0 | 85 |
| 9 | A | 0.50 | 1.15 | 8.0 | 92 |
| 10 | A | 0.50 | 1.20 | 9.0 | 86 |
| 11 | A | 0.50 | 1.10 | 10.0 | 74 |
| 12 | A | 1.5 | [d] 3.0 | | >120 |
| 13 | B | 1.5 | [d] 3.0 | | 39 |
| 14 | C | 1.5 | [d] 3.0 | | 65 |

[a] Percent of total weight of bath.
[b] Percent of dry weight of film; by nitrogen analysis.
[c] In water at 180°-190° F.
[d] Estimated, assuming 200% bath pickup, without allowing for substantivity of resin.

The results of runs 1-4, when plotted on coordinate paper, yield a substantially straight line. This indicates on the one hand that far less than 0.20% resin in the film imparts a significant amount of anchoring, and on the other hand that the film can advantageously contain several percent of the resin.

The results of runs 5-11 show that the anchoring effect of the resins is nearly independent of the pH at which they are employed, good results being obtained over the entire range pH 4-pH 10. No sharp peak was detected, but best results were obtained within the range pH 6-pH 9.

The results of runs 12-14 show that best results were obtained in the case of the resin having the highest viscosity.

Ordinarily, in tests such as the foregoing, incipience of sloughing is denoted by extensive separation of the topcoat at a freshly-cut edge of the film. No such separation was observed in these tests except in the case of the control films.

*Example 4*

Resin D was tested by the method of Examples 1-3 except that the pH of the bath was not adjusted. The bath was prepared by dissolving resin D in 8% of glycerol to supply 1.0% by weight of the resin to the bath. The pH of the bath thus obtained was 6.8. The time of the film to slough was 125 minutes.

These results show that high molecular weight polyalkylenepolyamines can be successfully used in place of the simple polyalkylenepolyamines.

*Example 5*

The effect of an anchoring agent of the present invention in bonding a waxy topcoat to regenerated cellulose film is illustrated by the following.

Test film was prepared by impregnating regenerated cellulose film with a bath containing 1% by weight of resin A and 8% by weight of glycerol and drying the film as described under Example 1. Control film was prepared by impregnating similar film in a solution of 8% aqueous glycerol, and drying in the same manner. Legends were written on each of the sheets employing a commercial red wax pencil used for writing on cellophane, glass, etc. and known as the "169-T Blaisdell China Marker." The effectiveness of resin A as anchoring agent was determined by soaking the films in water at room temperature. At the end of 16 hours of soaking it was found that the legends on the control sheets could be easily removed by gentle abrasion of the sheet between two fingers, whereas the legends on the test sheet containing the anchoring resin remained firmly attached. The sheets were replaced in the water and allowed to remain there for 48 hours more. At the end of that time a part of the legends on the control sheets had extensively disintegrated and in part had slid over the surface of the sheets, so that none of the legends could be read. The legends on the test sheets, however, were still firmly attached and were just as legible as at the outset.

The additional base materials benefited by a content of melamine-formaldehyde-polyalkylenepolyamine resin include organic films represented by ethyl cellulose, ethyl acetate, Pliofilm (chlorinated rubber), cellulose nitrate, and mylar (terephthalic acid-glycol polymer); synthetic polymeric material represented by polymerized methyl methacrylate and polystyrene; molded plastic material represented by vulcanized natural rubber and urea-formaldehyde, melamine-formaldehyde, and phenol-formaldehyde moldings; fibrous compositions represented by cotton muslin sheeting, wool felt and fur felt; woven textile products including cotton, nylon, Orlon, Dacron, wool, cellulose acetate, and rayon textiles; non-woven cellulose fabric; metals represented by aluminum, steel, tin, zinc chromium and magnesium (together with alloys represented by brass, bronze, Duralumin, stainless steel, and pewter; inorganic compositions represented by glass, glazed and unglazed vitreous ceramics, bricks, concrete, plaster (i. e. hydrated gypsum), and asbestos; natural lignin-containing cellulosic fibrous surfaces including lumber, plywood, wood veneer, and board formed by hot-pressing disintegrated wood fibers; and keratinous surfaces represented by leather, hair, fingernails, and horn.

The base materials of the present invention may have a low surface: weight ratio as in the case of films, sheets, cast shapes, extrusions, and moldings, or the material may have a high surface: weight ratio as in the case of fibers, fibrils, and pigment particles.

The foregoing is illustrated by the additional examples which follow:

RESIN E

For the examples referred to an anchoring resin was prepared by the following method.

A mixture of 72.2 gm. of melamine and 152 gm. of 37% formaldehyde in a flask equipped with reflux condenser, stirrer and thermometer was adjusted to pH 7.0 with caustic and heated at 90° C. until the "0° C. hydrophobe point" was reached (the point at which a drop of resin leaves a white streak when allowed to fall into ice water). At this point 311.2 gm. of 37% formaldehyde and 34.3 gm. of 3,3'-iminobispropylamine were added. The pH was then adjusted to 4.0 with aqueous hydrochloric acid and the temperature allowed to fall to 55° C. The reaction was allowed to continue at this temperature, the pH being maintained constant by addition of more acid as necessary. When the viscosity of the syrup reached P on the Gardner-Holdt scale at 25° C., 371 gm. of 37% formaldehyde was stirred in, the batch cooled to room temperature, and the pH adjusted to 7.0 with aqueous sodium hydroxide.

Example 6

The improved anchoring capacity of transparent synthetic organic films carrying resins of the present invention is illustrated by the following. An anchoring bath was prepared by forming a 1% (resin solids) solution of resin E in water. Into this were dipped half-way commercially produced films (about 0.001 inch thick) of the materials described below. The materials were allowed to drain dry overnight at room temperature and a number of heavy lines were drawn over the anchor coated and untreated (control) areas of the film with a wax pencil corresponding to that of Example 5. The anchoring capacity of the films was determined by immersing the sheets in water and noting the time at which the marks could first be smudged with light finger pressure. Results are as follows:

| Material | Minutes to Fail | |
|---|---|---|
| | Control | Anchor Coated |
| Mylar [1] | 20 | 24 |
| Pliofilm [2] | 7 | 28 |
| Saran [3] | 21 | 26 |
| Ethocel [4] | 2½ | 35 |
| Cellulose acetate | 5 | 35 |

[1] Terephthalic acid-glycol copolymer.
[2] Chlorinated rubber.
[3] Polyvinylidine chloride.
[4] Ethyl cellulose.

The foregoing results suggest that all organic film intended for topcoating should be treated with anchor resin as described, and that similar results may be expected when its material is in a form of thick sheets.

These results further suggest that when painted, varnished, or enameled surfaces are to be further painted, varnished, or enameled, the surfaces should be given a wash with melamine - formaldehyde - polyalkylenepolyamine resin to promote adhesion of the subsequent coat. Such anchoring would appear to be particularly desirable in instances where enameled woodwork is to be re-enameled. It is usually quite difficult to make fresh enamel adhere firmly to old and hardened enamel, and in most instances good practice requires that the old surface be sandpapered to etch it or give it a "tooth" for anchoring purposes. The results suggest that sufficient anchoring is provided when the old enamel is anchor-resin treated as described.

Example 7

The following illustrates the strong anchoring capacity possessed by wood according to the present invention.

A smoothly sanded maple board measuring 12" x 6" x ¾" was immersed longitudinally half-way into an aqueous solution containing 0.5% by weight of resin E for about 10 seconds so that the lower half of the board was wet with the resin. The board was drained at room temperature, dried at 200° F. for 5 minutes, cooled to room temperature, sprayed on one side with a clear cellulose nitrate lacquer (25% solids) such as is used commercially in finishing furniture, air-dried overnight, and buffed to a high luster on the lacquered side. The board thus prepared was completely immersed in water at room temperature for four days. At the end of this time the board was completely water-logged so that it would not float, and the water was clearly visible through the lacquer coating. The lacquer on the half of the board which had not been treated with the anchoring resin had practically completely flaked off from the wood, and the small area that remained appeared to be on the point of separation. The lacquer on the anchor-resin treated portion of the wood, however, was almost unchanged in appearance. It was firmly attached to the wood, and had not undergone flaking. It substantially retained all of its original luster and had only a few small cracks.

A piece was sawn from the board and allowed to dry out at room temperature over several days. The lacquer over the anchor-resin treated portion of the board resumed its original appearance, the cracks then being practically unnoticeable but by the time the board was dry practically all of the lacquer on the untreated (control) portion of the board had flaked off.

These results suggest that all wood intended to be painted, varnished, or glued and put to maritime use, including plywood, should be given a content of anchor resin according to the present invention.

Example 8

The following illustrates the anchor coating of steel and the effect thereof in improving the adhesion thereto of standard lacquers and regenerated cellulose film as top-coat material.

Three 3" x 6" bright cold rolled steel plates (representative of the steel used for the manufacture of automobile bodies) were degreased with carbon tetrachloride, dipped half-way into a 0.5% aqueous solution of Resin E and drained dry overnight at room temperature.

The first panel was sprayed with a black oxidizing-type glycerol-phthalate-soya-castor oil lacquer containing 12.5% by weight of an oil soluble water insoluble alkylated melamine-formaldehyde resin. This lacquer was of the type commercially used for lacquering metal.

The second panel was sprayed with a hydroxyethyl methacrylate-styrene-butylmethacrylate lacquer containing butylated melamine formaldehyde resin lacquer prepared according to the Example in column 8 of U. S. Patent No. 2,681,897. The lacquer contained 70 parts by weight of resin A of the patent and 30 parts by weight of copolymer 1, described in column 4 thereof. This lacquer was pigmented with titanium dioxide and had been rated as very suitable for use in the manufacture of household mechanical refrigerators.

To the third panel was applied a sheet of ordinary untreated regenerated cellulose film in wet swollen condition. The film was rolled on with a rubber roller so as to remove bubbles, and allowed to become apparently dry at room temperature overnight.

The lacquered panels were baked at 300° F. for 5 minutes and the third panel at 200° F. for 1 minute.

Adhesion of the lacquers was tested by scraping the coatings with the blade of a sharp pen-knife, using quite heavy pressure and holding the blade at right angles to the panels. In each instance the lacquer chipped readily when the knife was scraped over the untreated portions of the plates, the blade laying bare bright metal and leaving a path having jagged edges. When, however, the blade reached the treated portions of the panels, this type of chipping stopped and the principal effect of the knife was merely to scrape off a layer of the lacquer.

The third plate was tested by comparing the effort required to peel the film from the treated and untreated portions of the panel. The film readily peeled from the untreated part of the panel but adhered quite firmly to the part that had been treated with the anchor resin.

The second steel plate was bent about a radius of 5/8", the bend being made at right angles to the line formed when the plate was dipped into the anchoring resin solution. The lacquer flaked, chipped and broke away at the bend from the portion of the plate which had not been treated with the anchoring resin but no failure whatever could be seen on the treated portion of the plate.

The foregoing suggests that the steel which is anchor coated according to the present invention has improved receptivity or adhesion for all types of organic coatings including anticorrosive paints, such as red lead and zinc chromate; air-drying and baking enamels; thermoplastic hot melt coating including mastic and asphalt; adhesives such as are used to cement rubber and synthetic rubber thereto; and organic hydrophobic preformed film material including the films referred to in Example 6.

Example 9

It is well known that paint, lacquers, enamels, etc. adhere poorly to aluminum. The following illustrates the improved receptivity of aluminum carrying an anchor resin according to present invention.

A 3" x 6" panel of 16 gauge cold rolled aluminum which was free from grease was dipped half-way into a 0.5% water solution of resin E, dried overnight at room temperature in vertical position and sprayed with a blue-tinted non-drying glyceryl phthalate alkyd resin in xylene. This solution is a lacquer frequently used for the painting of aluminum aircraft. The panel was dried for 24 hours at room temperature and the comparative adhesion of the coating found by scraping with a pen-knife as described in the foregoing example.

The lacquer flaked freely from the portion of the plate which had not been dipped in the anchor solution, but was much more difficult to flake from the portion of the plate that had been treated. The adhesion was further tested by scoring the panel lengthwise, pressing lengths of pressure-sensitive masking tape across the scratches, and ripping the tapes from the surface by a snatch pull. As a result of this test, the lacquer was extensively removed from the untreated portion of the panel but no lacquer could be removed from the half of the panel which had been dipped in the resin solution.

These results show that the anchor resin effected a major improvement.

At the present time aluminum is widely used in the construction of aircraft and the super structure of combatant vessels of the navy, and for military and civilian equipment intended to be transported by air. The latter includes equipment designed for air-borne assault troops. Such equipment is customarily painted both for camouflage purposes and to protect the aluminum from the corrosive action of salt spray. The results of the present example suggest that aluminum should be anchor coated according to the present invention before it is given a protective organic coating.

Example 10

The thickness and weight per unit area of anchor resin deposited on sheet aluminum in one instance according to the present invention was determined by weighing a fresh panel of aluminum, dipping the panel into the anchor resin solution of Example 9, allowing the panel to drain dry in a vertical position, re-weighing the panel, and performing the indicated calculations. The weight of anchoring resin on the aluminum was thus found to be 0.00505 gm. per square foot of aluminum surface. The thickness of the film was determined by micrometer. An average of ten measurements on different points of the panel gave a value of 0.00005 inch. This suggests that a much more dilute solution of the resin might have been satisfactorily used in Example 9.

Example 11

The superior adhesiveness of anchor resin treated tinplate is illustrated by the following.

Three 3" x 6" laboratory test panels of 20 gauge tinplate (sheet steel which had been dipped into molten tin) were anchor coated, and topcoated according to Example 8, the first plate being sprayed with the blue aircraft lacquer of Example 9, and the second panel being sprayed with a 50% xylene solution of a titanium dioxide pigmented glyceryl phthalate-linseed oil modified acrylonitrile-styrene resin. This solution is a lacquer frequently used for finishing metal.

In the case of the two lacquered panels, the results were about the same as in the case of the steel panels of Example 8, the lacquers on the treated portions of the panel exhibiting much better adhesion than the lacquers on the untreated portions. The adhesiveness of the regenerated cellulose film on the treated portion of the third panel was somewhat better than in the case of the steel panel.

Example 12

A sheet of chromium-plated brass was anchor coated and coated with regenerated cellulose film in the same manner as the steel of Example 8. When tested by peeling the film was found to have very tight adhesion to the anchor resin treated part of the sheet and much less adhesion to the part of the sheet which had not been so treated.

Example 13

The following illustrates the anchor coating of textile materials and the application of topcoat material thereto.

There is a large market for coated fabrics suitable for such uses as raincoats, upholstery materials, book bindings, oil cloth, wall coverings, and floor coverings. One drawback of these fabrics is that the coating tends to separate as the material is used and particularly as the material is repeatedly folded. Fabrics carrying an anchoring resin according to the present invention display improved adhesion for coating materials whereby the useful life of the coated fabric is prolonged. This is illustrated as follows.

Switches of medium weight viscose rayon suiting, 80 x 80 cotton percale and nylon parachute cloth were stacked and cut in half to furnish two sets of samples for comparative test. One of the sets of half swatches thus prepared was immersed in a 1% aqueous solution of Resin A and the second set was immersed in water, each set being immersed for 5 minutes at room temperature. The sets of samples were separated, passed through a wringer, and dried at 200° F. for five minutes, and then trimmed to 5" x 5".

Sheets of polyvinylbutyral 0.010 inch thick and sheets of polyethylene 0.003 inch thick were cut into squares 4" x 4" and centered between two swatches of fabric as shown in the table below. The assemblies thus formed were pressed for 5 minutes in a hydraulic press at 67 lbs. per square inch pressure at the temperature shown in the table below. The resulting laminates were cooled to room temperature and test strips ½" wide and the pieces cut into strips ½" wide. The maximum force required to delaminate each of the assemblies for a distance of 3 inches along its length was determined in a Schopper paper tensile strength tester. Results were as follows:

| Press No. | Fabric | Anchor Resin | Lamination | | Delamination | |
|---|---|---|---|---|---|---|
| | | | Adhesive¹ | Temp., °C. | Max. Force lb. | Percent Improvement |
| 1 | Rayon | None | PVB | 85 | 2.96 | |
| 2 | do | Yes | PVB | 85 | 3.93 | 32.6 |
| 3 | do | None | PE | 115 | 3.23 | |
| 4 | do | Yes | PE | 115 | 3.78 | 17.0 |
| 5 | Cotton | None | PVB | 85 | 5.65 | |
| 6 | do | Yes | PVB | 85 | 6.23 | 10.3 |
| 7 | do | None | PE | 115 | 2.99 | |
| 8 | do | Yes | PE | 115 | 3.69 | 23.4 |
| 9 | Nylon | None | PVB | 85 | 3.58 | |
| 10 | do | Yes | PVB | 85 | 4.88 | 32.6 |

¹ PVB=polyvinylbutyral; PE=polyethylene.

These results show that the bonding of hydrophobic organic resinous coatings to textiles is much improved when the textiles carry a small but effective amount of melamine-formaldehyde polyalkylenepolyamine resin as anchoring agent. The results suggest that all textiles should be treated with anchoring resin in the same manner before being subjected to printing or painting.

*Example 14*

The improved adhesiveness of steel for adhesive type thermoplastic resins after treatment with anchoring resins according to the present invention is illustrated by the following.

Degreased bright 16 gauge steel plate was cut to form four strips each 1" x 3". Two of the strips were dipped in a 0.5% aqueous solution of resin E and the remaining two strips were similarly dipped in water. The four strips were allowed to drain dry at room temperature overnight. The two resin treated strips were assembled in overlapping fashion and the two water-treated strips were similarly assembled, and a one-inch square of 0.01-inch thick polyvinylbutyral sheet inserted between each assembly as adhesive. Both assemblies were pressed at 165 lbs. per square inch pressure at 110° C. for 5 minutes and cooled to room temperature. The force (shear strength) required to pull the strips apart was measured in a standard Baldwin laboratory tensile strength tester.

The control laminate (formed from the two strips which had not been treated with anchor resin solution) separated at 201 lbs. per square inch of pull, while the anchor treated metal separated at 291 lbs. per square inch of pull, an increase of 44.7%.

*Example 15*

The increased affinity of keratinous material carrying a small amount of anchor agent for topcoat material is illustrated by the following.

The fingernails of a human subject were degreased by washing, after which the left hand nails were swabbed with a 0.5% solution of Resin E and the right hand nails were swabbed with water. The nails were allowed to dry and were then coated with a commercial red nail lacquer. The lacquer was a pigmented plasticized nitrocellulose lacquer containing acetone and lower alkyl esters as solvents.

The lacquer was allowed to dry for one hour after which the subject resumed her duties which included washing dishes. After four days the lacquer on the right hand (control) fingernails had chipped in several places along the cuticle, and had chipped very extensively along the edges, the width of the chipped areas being about $\frac{1}{16}$", rendering the nails unattractive. The lacquer on the left hand (treated) fingernails, however, had a total of only three small and inconspicuous chips and thus was nearly in its original condition.

The foregoing suggests that similar substrates such as leather, horn, parchment and casein plastics display increased affinity for topcoat material when carrying anchoring agent according to the present invention.

*Example 16*

A 3" x 6" rolled copper panel which had lost its brightness was degreased in carbon tetrachloride, dipped half-way into a 1% aqueous solution of resin E, and air-dried. Lines were drawn vertically down the panel with a china marking pencil corresponding to that of Example 5. The plate was then immersed in water at room temperature. After 5 minutes the pencil marks on the treated and untreated portion of the plate were lightly rubbed with the fingers. The lines on the untreated portion of the panel smudged readily and the lines on the treated portion of the panel smudged with considerable difficulty, showing that anchor resin treated copper has increased affinity for topcoat material.

It is customary to lacquer copper objects of art after they have been brightly polished since copper oxidizes readily. The foregoing suggests that copper should be treated with anchoring resin according to the present invention, before it is lacquered.

*Example 17*

It is generally recognized that nitrocellulose lacquers exhibit particularly poor adhesion as compared with other common surface coatings. The following shows that the adhesion of nitrocellulose lacquer to glass, aluminum, magnesium and copper is greatly improved when these materials carry a small amount of anchoring resin. It will be observed that aluminum and magnesium are recognized as surfaces which are particularly difficult to coat.

Grease free panels of the materials mentioned were dipped half-way into a 0.5% solution of Resin E, dried for 15 minutes at 200° F. in an oven, and streaked by flowing a sea-blue commercial nitrocellulose lacquer containing about 25% by weight of solids over the surface of the panels and allowing the plates to dry in a vertical position at room temperature.

After 24 hours or drying the adhesiveness of the coatings was determined by the scrape test of Example 8. The adhesion of the lacquer on the treated areas of the glass and copper panels was much better than the adhesion of the lacquer on the untreated portions thereof. In the case of magnesium and aluminum the adhesion of the lacquer was very much better.

*Example 18*

The following shows the improved affinity for magnesium and glass substrates anchor coated according to the present invention towards acrylate topcoat material.

A magnesium panel and a glass panel were anchor coated by dipping half-way into a 1% aqueous solution of Resin E, followed by drying for 5 minutes at 200° F. The panels were then sprayed with a commercial black pigmented air-drying methyl methacrylate lacquer (known as krylon), after which the panels were dried and adhesion of the lacquer determined by the scrape test of Example 8. The adhesion of the lacquer on the anchor resin treated parts of the panel was much superior to the adhesion of the lacquer on the untreated parts of the panels.

We claim:

1. As an article of manufacture, a solid base material having at a surface thereof a small but effective amount of an anchor agent for subsequently applied topcoat material, said agent being an insoluble gel formed by drying beyond its gel point a formerly water-dispersible cationic melamine - formaldehyde - polyalkylene - polyamine resin containing more than 5 mols of combined formaldehyde per mol of melamine, the ratio of the number of nitrogen atoms in said polyalkylenepolyamine to the number of mols of said melamine being between about 0.3:1 and 10:1.

2. An article according to claim 1 wherein the base material is cellulose.

3. An article according to claim 2 wherein the base material is non-fibrous regenerated cellulose film.

4. An article according to claim 1 wherein the base material is metal.

5. An article according to claim 4 wherein the base material is steel.

6. An article according to claim 4 wherein the base material is aluminum.

7. An article according to claim 1 wherein the base material is a homogeneous inorganic siliceous composition.

8. An article according to claim 7 wherein the base material is glass.

9. An article according to claim 7 wherein the material is concrete.

10. An article according to claim 1 having a surface pH between about 6.5 and 9.0.

11. An article according to claim 1 wherein the resin is substantially completely polymerized.

12. An article according to claim 1 wherein the ratio of the number of nitrogen atoms in the polyalkylenepolyamine to the number of mols of melamine is between 0.5 and 4.0.

13. As an article of manufacture, solid base material having at a surface thereof of small but effective amount of an anchor agent and topcoat material over said anchor agent, said agent being an insoluble gel formed by drying beyond its gel point a formerly water-dispersible cationic melamine - formaldehyde-polyalkylenepolyamine resin containing 5 mols of combined formaldehyde per mol of melamine, the ratio of the number of nitrogen atoms in said polyalkylenepolyamine to the number of mols of said melamine being between about 0.3:1 and 10:1.

14. An article according to claim 13 wherein the topcoat material is a continuous organic film.

15. An article according to claim 13 wherein the topcoat material is a continuous metal film.

16. A film of non-fibrous regenerated cellulose having a pH between about 6.5 and 7.5 impregnated with between about 0.1% and 6% of its weight of a melamine-formaldehyde-polyalkylenepolyamine resin cured beyond its gel point; said resin being characterized in that it contains more than 6 mols of combined formaldehyde per mol of melamine, and the ratio of the number of nitrogen atoms in the polyalkylene-polyamine to the number of mols of the melamine is between 0.5:1 and 10:1.

17. A sheet of non-fibrous regenerated cellulose having a pH between about 6.5 and 7.5 impregnated with between about 1% and 3% of a melamine-formaldehyde-polyalkylenepolyamine resin cured beyond its gel point and coated with an organic topcoat; said resin being characterizd in that it contains more than 6 mols of combined formaldehyde per mol of melamine, and the ratio of the number of nitrogen atoms in the polyalkylene-polyamine to the number of mols of the melamine is between 0.5:1 and 10:1.

18. A process for improving the adhesion of solid base material subsequently applied topcoat material for, which comprises contacting said base material with a cationic melamine-formaldehyde-polyalkylenepolyamine resin in dilute aqueous dispersion thereby applying to said base material a small but effective amount of said resin as anchoring agent for subsequently applied topcoat material, said resin containing more than 5 mols of combined formaldehyde per mol of melamine, the ratio of the number of nitrogen atoms in said polyalkylenepolyamine to the number of mols of said melamine being between about 0.3:1 and 10:1, and drying the resin beyond its gel point.

19. A process according to claim 18 wherein the base material is non-fibrous regenerated cellulose film and said film is impregnated with an aqueous dispersion of said resin.

20. A process according to claim 18 wherein the base material is heated to between about 150 F. and 240° F. to substantially completely polymerize the resin thereon.

21. A process for providing a non-fibrous regenerated cellulosic film with an anchoring medium adopted to improve adhesion of a subsequently applied organic moistureproofing topcoat, which comprises impregnating said film with an aqueous dispersion containing between about 0.05% and 3% of a cationic melamine-formaldehyde-polyalkylenepolyamine resin in colloidal form at about pH 6.5–7.5, said resin containing more than 6 mols of combined formaldehyde per mol of melamine, the number of nitrogen atoms in the polyalkylenepolyamine per mol of melamine being between 0.5 and 10 and heating said film impregnated with said resin at about 150° F. to 240° F. at least until dry thereby curing said resin beyond its gel point.

22. A process for bonding an organic water-proofing topcoat to non-fibrous regenerated cellulose film, which comprises impregnating said film with an aqueous dispersion containing between about 0.05% and 3% by weight of a cationic melamine-formaldehyde-polyalkylenepolyamine resin in colloidal form at a pH between about 6.5 and 7.5, said resin containing more than 6 mols of combined formaldehyde per mol of melamine, the number of nitrogen atoms in the polyalkylenepolyamine per mol of melamine being between 0.5 and 10, heating said film impregnated with said resin at about 170° F. to 240° F. at least until dry, thereby curing said resin beyond its gel point and then depositing an organic waterproofing topcoat on said film.

References Cited in the file of this patent

UNITED STATES PATENTS

| | | |
|---|---|---|
| 2,388,235 | Bowman et al. | Nov. 6, 1945 |
| 2,423,428 | Pollard | July 1, 1947 |
| 2,546,575 | Wooding | Mar. 27, 1951 |

UNITED STATES PATENT OFFICE

CERTIFICATE OF CORRECTION

Patent No. 2,796,362                          June 18, 1957

William M. Wooding et al.

It is hereby certified that error appears in the printed specification of the above numbered patent requiring correction and that the said Letters Patent should read as corrected below.

Column 4, line 59, for "occurs more" read --occurs when more--; column 13, line 13, for "Switches" read --Swatches--; column 14, line 72, for "24 hours or drying" read --24 hours of drying--; column 16, line 20, after "material", second occurrence, strike out the word "for" and insert the same after "material", first occurrence, same line.

Signed and sealed this 20th day of August 1957.

(SEAL)
Attest:
KARL H. AXLINE
Attesting Officer

ROBERT C. WATSON
Commissioner of Patents